(12) United States Patent
Wagner

(10) Patent No.: US 7,815,886 B2
(45) Date of Patent: Oct. 19, 2010

(54) REACTANT LIQUID SYSTEM FOR FACILITATING THE PRODUCTION OF CARBON NANOSTRUCTURES

(75) Inventor: Anthony S. Wagner, Buchanan Dam, TX (US)

(73) Assignee: Clean Technology International Corporation, Sherwood, AR (US)

(*) Notice: Subject to any disclaimer, the term of this patent is extended or adjusted under 35 U.S.C. 154(b) by 219 days.

(21) Appl. No.: 11/931,901

(22) Filed: Oct. 31, 2007

(65) Prior Publication Data

US 2008/0050303 A1    Feb. 28, 2008

Related U.S. Application Data

(63) Continuation of application No. 11/173,419, filed on Jul. 1, 2005, now abandoned, which is a continuation-in-part of application No. 10/887,695, filed on Jul. 9, 2004, now Pat. No. 7,550,128, and a continuation-in-part of application No. 11/025,717, filed on Dec. 29, 2004, now Pat. No. 7,563,426.

(51) Int. Cl.
  *B01J 19/08*    (2006.01)
  *F23G 7/00*    (2006.01)

(52) U.S. Cl. .................. 423/445 B; 423/447.1; 423/447.3; 977/842; 977/844; 110/235; 110/237; 110/243

(58) Field of Classification Search ............ 423/445 B, 423/460, 461, DIG. 12, 447.1, 447.3; 110/235, 110/237, 243; 977/842, 844
See application file for complete search history.

(56) References Cited

U.S. PATENT DOCUMENTS 3,066,099 A    11/1962    Mohun
4,357,234 A    11/1982    Inculet et al.
4,663,230 A    5/1987    Tennent
5,000,101 A    3/1991    Wagner
5,094,906 A    3/1992    Witzke et al.
5,167,919 A    12/1992    Wagner
5,271,341 A    12/1993    Wagner
5,346,683 A    9/1994    Green et al.
5,359,947 A    11/1994    Wagner (Continued)

FOREIGN PATENT DOCUMENTS

WO    WO 2006/085969 A2    8/2006

OTHER PUBLICATIONS

Dresselhaus, et al., Carbon Nanotubes Synthesis, Structure, Properties, and Applications, Topics in Applied Physics 2001; 80: 1-9, 12-19.*

(Continued)

*Primary Examiner*—Stanley S. Silverman
*Assistant Examiner*—Daniel C. McCracken
(74) *Attorney, Agent, or Firm*—Russell D. Culbertson; The Culbertson Group, P.C.

(57) ABSTRACT

A method includes isolating carbon atoms as conditioned carbide anions below a surface of a reactant liquid. The conditioned carbide anions are then enabled to escape from the reactant liquid to a collection area where carbon nanostructures may form. A carbon structure produced in this fashion includes at least one layer made up of hexagonally arranged carbon atoms. Each carbon atom has three covalent bonds to adjoining carbon atoms and one unbound pi electron.

17 Claims, 5 Drawing Sheets

U.S. PATENT DOCUMENTS

| | | | |
|---|---|---|---|
| 5,424,054 | A | 6/1995 | Bethune et al. |
| 5,431,113 | A | 7/1995 | Wagner |
| 5,452,671 | A * | 9/1995 | Wagner ..................... 110/346 |
| 5,457,343 | A | 10/1995 | Ajayan et al. |
| 5,461,991 | A | 10/1995 | Wagner |
| 5,482,601 | A | 1/1996 | Ohshima et al. |
| 5,489,477 | A | 2/1996 | Ohta et al. |
| 5,553,558 | A | 9/1996 | Wagner |
| 5,560,898 | A | 10/1996 | Uchida et al. |
| 5,564,351 | A | 10/1996 | Wagner |
| 5,640,702 | A | 6/1997 | Shultz |
| 5,641,466 | A | 6/1997 | Ebbesen et al. |
| 5,695,734 | A | 12/1997 | Ikazaki et al. |
| 5,698,175 | A | 12/1997 | Hiura et al. |
| 5,753,088 | A | 5/1998 | Olk |
| 5,832,845 | A | 11/1998 | Wagner |
| 5,876,684 | A | 3/1999 | Withers et al. |
| 6,037,517 | A | 3/2000 | Wagner |
| 6,069,290 | A | 5/2000 | Wagner |
| 6,195,382 | B1 | 2/2001 | Wagner |
| 6,227,126 | B1 * | 5/2001 | Wagner ..................... 110/250 |
| 6,256,466 | B1 | 7/2001 | Ota et al. |
| 6,270,735 | B2 | 8/2001 | Wagner |
| 6,303,094 | B1 | 10/2001 | Kusunoki et al. |
| 6,333,016 | B1 | 12/2001 | Resasco et al. |
| 6,346,221 | B1 | 2/2002 | Wagner |
| 6,355,857 | B1 | 3/2002 | Wagner |
| 6,451,175 | B1 | 9/2002 | Lal |
| 6,455,021 | B1 | 9/2002 | Saito |
| 6,669,755 | B2 | 12/2003 | Wagner |
| 6,683,783 | B1 | 1/2004 | Smalley et al. |
| 6,717,026 | B2 | 4/2004 | Wagner |
| 6,740,224 | B1 | 5/2004 | Benavides et al. |
| 6,740,403 | B2 | 5/2004 | Gogotsi et al. |
| 6,761,871 | B2 | 7/2004 | Little |
| 6,765,949 | B2 | 7/2004 | Chang |
| 6,841,003 | B2 | 1/2005 | Kang et al. |
| 6,843,850 | B2 | 1/2005 | Avouris et al. |
| 6,929,676 | B2 | 8/2005 | Wagner |
| 7,034,197 | B2 | 4/2006 | Wagner |
| 7,365,237 | B2 | 4/2008 | Wagner |
| 7,550,128 | B2 * | 6/2009 | Wagner ................. 423/445 B |
| 7,563,426 | B2 * | 7/2009 | Wagner ................. 423/445 R |
| 7,587,985 | B2 * | 9/2009 | Wagner ..................... 110/243 |
| 2002/0102193 | A1 | 8/2002 | Smalley et al. |
| 2002/0127169 | A1 | 9/2002 | Smalley et al. |
| 2002/0159943 | A1 | 10/2002 | Smalley et al. |
| 2003/0109768 | A1 | 6/2003 | Wagner |
| 2003/0129119 | A1 | 7/2003 | Chiu et al. |
| 2004/0057896 | A1 | 3/2004 | Kronholm et al. |
| 2004/0191138 | A1 | 9/2004 | Wagner |
| 2005/0261760 | A1 | 11/2005 | Weber |
| 2006/0008403 | A1 | 1/2006 | Wagner |
| 2006/0008405 | A1 | 1/2006 | Wagner |
| 2006/0008406 | A1 | 1/2006 | Wagner |
| 2006/0021510 | A1 | 2/2006 | Henley et al. |
| 2006/0034746 | A1 | 2/2006 | Wagner |
| 2007/0116633 | A1 | 5/2007 | Wagner |
| 2008/0050303 | A1 | 2/2008 | Wagner |
| 2008/0056980 | A1 | 3/2008 | Wagner |

OTHER PUBLICATIONS

Mamalis, et al., Nanotechnology and nanostructured materials: trends in carbon nanotubes, Precision Engineering 2004; 28: 16-30.*

Dai, Carbon nanotubes: opportunities and challenges, Surface Science 2002: 500: 218-241.*

Height, et al., Flame synthesis of single-walled carbon nanotubes, Carbon 2004; 42: 2294-2307.*

Bogdanov et al., "Development Prospects of the Commercial Production of Fullerenes," Technical Physics, vol. 45, No. 5 (2000), 8 pages.

Dai, "Carbon nanotubes: opportunities and challenges," Elsevier, Surface Science, vol. 500 (2002), 24 pages.

Dresselhaus et al., "Introduction to Carbon Materials Research," Topics Applied Physics, vol. 80 (2001), 26 pages.

Dresselhaus et al., "Fullerenes," Journal of Materials Research, vol. 8, No. 8 (1993), 44 pages.

Height et al., "Flame synthesis of single-walled carbon nanotubes," Elsevier, Carbon, vol. 24 (2004), 13 pages.

Journet et al., "Large-scale production of single-walled carbon nanotubes by the electric-arc technique," Nature, vol. 388 (Aug. 21, 1997), 3 pages.

Journet et al., "Production of carbon nanotubes," Applied Physics A, Materials Science & Processing, vol. 67 (1998), 9 pages.

Kasatochkin et al., "On Crystalline Structure of Carbyne," Carbon, vol. 11 (1973), 5 pages.

Mamalis et al., "Nanotechnology and nanostructured materials: trends in carbon nanotubes," Elsevier, Precision Engineering, vol. 28 (2004), 15 pages.

Ru et al., "Attraction and orientation phenomena of bucky onions formed in a transmission electron microscrope," Chemical Physics Letters, vol. 259 (1996), 7 pages.

International Search Report for PCT/US2005/029085 dated Sep. 5, 2006, 2 pages.

Written Opinion of the International Search Authority (PCT Rule 43bis. 1) for PCT/US2005/029085 dated Sep. 5, 2006, 3 pages.

International Search Report for PCT/US2005/045334 dated May 19, 2008, 2 pages.

Written Opinion of the International Search Authority (PCT Rule 43bis. 1) for PCT/US2005/045334 dated May 19, 2008, 5 pages.

International Search Report for PCT/US2006/023962 dated Jul. 17, 2008, 2 pages.

Written Opinion of the International Search Authority (PCT Rule 43bis. 1) for PCT/US2006/023962 dated Jul. 17, 2008, 4 pages.

International Search Report for PCT/US2007/067794 dated Apr. 30, 2008, 2 pages.

Written Opinion of the International Search Authority (PCT Rule 43bis. 1) for PCT/US2007/067794 dated Apr. 30, 2008, 6 pages.

Wagner, "Method and Apparatus for Producing Carbon Nanostructures," filed Oct. 31, 2007, U.S. Appl. No. 11/931,802, 30 pages.

Wagner, "Method and Apparatus for Preparing a Collection Surface for Use in a Produccing Carbon Nanostructures," filed Oct. 31, 2007, U.S. Appl. No. 11/932,020, 34 pages.

Communication pursuant to Article 153(7) EPC dated Feb. 11, 2009 (European Application No. 05857563.0-1218), 8 Pages.

Communication pursuant to Article 153(7) EPC dated Feb. 12, 2009 (European Application No. 05857494.8-1218), 7 Pages.

Written Opinion of the International Search Authority (PCT Rule 43bis. 1) for PCT/US2005/23370 dated Sep. 20, 2006 (4 Pages).

International Search Report for PCT/US2005/23370 dated Sep. 20, 2006 (2 Pages).

A. Levesque et al., "Monodisperse carbon nanopearls in a foam-like arrangement: a new carbon nano-compound for cold cathodes," Elsevier, Thin Solid Films (464-465), Jul. 28, 2004. 7 pages.

* cited by examiner

REACTANT LIQUID SYSTEM FOR FACILITATING THE PRODUCTION OF CARBON NANOSTRUCTURES

CROSS-REFERENCE TO RELATED APPLICATIONS

This application is a continuation of U.S. patent application Ser. No. 11/173,419, filed Jul. 1, 2005 now abandoned, and entitled "Reactant Liquid System for Facilitating the Production of Carbon Nanostructures," which is a continuation-in-part of U.S. patent application Ser. No. 10/887,695, filed Jul. 9, 2004 now U.S. Pat. No. 7,550,128, and entitled "Method and Apparatus for Producing Carbon Nanostructures," and a continuation-in-part of U.S. patent application Ser. No. 11/025,717, filed Dec. 29, 2004 now U.S. Pat. No. 7,563,426, and entitled "Method and Apparatus for Preparing A Collection Surface for Use in Producing Carbon Nanostructures." The Applicant claims the benefit of each of these applications under 35 U.S.C. §120. The entire content of each of these applications is incorporated herein by this reference.

TECHNICAL FIELD OF THE INVENTION

The present invention relates to methods for manufacturing carbon nanotubes and other carbon nanostructures from a carbon-bearing feedstock. In particular, the invention relates to methods for placing carbon atoms in condition to form impurity-free carbon nanostructures. The invention also includes a particular type of carbon nanostructure.

BACKGROUND OF THE INVENTION

Carbon nanostructures have received a great deal of interest since their discovery. It has been suggested that carbon nanostructures may have important applications in electronics, in materials sciences, and in a number of additional fields. As used in this disclosure, a carbon nanostructure comprises a structure formed from chemically bonded carbon atoms, with or without impurities or intentionally added materials incorporated in the carbon structure or adjacent to the carbon structure. Carbon nanostructures include structures in which carbon atoms are arranged in generally a series of interconnected hexagonal rings formed into a tube or other structure. Carbon nanostructures may be single walled or multiple walled nanotubes, nanofibers, nanorope, or nanowire. Single wall nanotubes include a single layer of the hexagonally arranged carbon atoms, while multiple walled nanotubes are made up of an inner layer of carbon atoms and a series of one or more outer layers of hexagonally arranged carbon atom structures.

Despite the interest in carbon nanostructures and the potentially important uses for such structures, the practical application of carbon nanostructures in products has been slowed by the difficulty in manufacturing such structures. Two general types of processes have been employed to produce or isolate carbon nanostructures. One process type uses a plasma arc between carbon electrodes. U.S. Pat. Nos. 5,482,601 and 5,753,088 describe such carbon plasma arc processes for producing carbon nanotubes. Another process type involves simply isolating naturally formed carbon nanotubes from graphite and soot. Such an isolation process or refinement process for carbon nanotubes is described in U.S. Pat. No. 5,560,898.

The prior processes for producing or isolating carbon nanotubes have been found to produce only small quantities of carbon nanotubes of inconsistent quality. The low quality carbon nanotubes produced or isolated by the prior methods commonly included metal or other atoms incorporated in the carbon structure. These impurities incorporated in the walls of the carbon nanotubes may have a negative impact on the qualities and properties of the nanotube and may render it unsuitable for an intended purpose. In particular, prior carbon nanostructure production techniques include no mechanism for preventing hydrogen atoms and other atoms that may be present in the carbon-bearing feed material from being incorporated into the nanocarbon structure. Also, prior carbon nanostructure production techniques tend to allow carbon from the feed material to become incorporated into the carbon nanostructures in an unpredictable fashion outside of the desired interconnected hexagonal ring structure. This inclusion of amorphous carbon in the resulting carbon nanostructure greatly degrades the properties and usefulness of the resulting carbon nanostructure.

SUMMARY OF THE INVENTION

The present invention provides methods for placing carbon in condition to form high-quality, substantially impurity-free carbon nanostructures. The present invention also encompasses a novel type of carbon nanostructure.

A method according to the present invention includes isolating carbon atoms as conditioned carbide anions below a surface of a reactant liquid. The conditioned carbide anions are then allowed to escape from the reactant liquid to a collection area where carbon nanostructures may form. The isolation of carbon atoms as conditioned carbide anions includes two components. A first component involves separating the carbon atoms from a carbon-bearing feed material that has been introduced into the reactant liquid and preventing the carbon atoms from combining with other materials. The second component of isolating carbon atoms as the desired conditioned carbide anions involves increasing the energy state of the separated and isolated carbon atoms. The desired energy state of carbide anions within the scope of the present claims is at least the SP3 hybrid energy state, in which the carbide anions have absorbed greater than 22 eV (electron volt) of energy from the reactant liquid bath. Thus, a "conditioned carbide anion" within the scope of the present claims refers to a carbide anion at least at the SP3 hybrid energy state.

The isolation of carbon atoms as conditioned carbide anions within the scope of the present invention may be accomplished by chemical reduction, chemical oxidation, reactions from acids, bases, or salts, or pyrolysis in the reactant liquid. For example, one preferred form of the invention utilizes a liquid reactant metal to chemically reduce a carbon-bearing feed material to isolate carbon atoms from the feed material and elevate the energy state of the isolated carbon atoms to form the desired conditioned carbon anions, that is, carbon anions at least at the SP3 hybrid energy state. Regardless of the particular mechanism by which the reactant liquid isolates the carbon atoms, maintaining carbon atoms that have been separated from the feed material below the surface of the reactant liquid allows the carbon atoms to remain isolated from each other and other materials with which bonds could form and allows the carbon atoms to be energized to the desired conditioned state.

A carbon structure according to the present invention includes at least one layer made up of hexagonally arranged carbon atoms. Each carbon atom has three covalent bonds to adjoining carbon atoms and one unbound pi electron. Thus, the carbon structure according to the present invention is a pure carbon structure, free of contaminating amorphous carbon and any other contaminating atoms. The carbon structure according to the invention is also free of hydrogen that would otherwise form a fourth covalent bond with each carbon atom. This contamination-free and hydrogen-free carbon structure may take the form of flat sheets of material or single or multi-walled tubes.

These and other advantages and features of the invention will be apparent from the following description of the preferred embodiments, considered along with the accompanying drawings.

DESCRIPTION OF PREFERRED EMBODIMENTS

The claims at the end of this application set out novel features which the Applicant believes are characteristic of the invention. The various advantages and features of the invention together with preferred modes of use of the invention will best be understood by reference to the following description of illustrative embodiments read in conjunction with the drawings introduced above.

Figure 1:
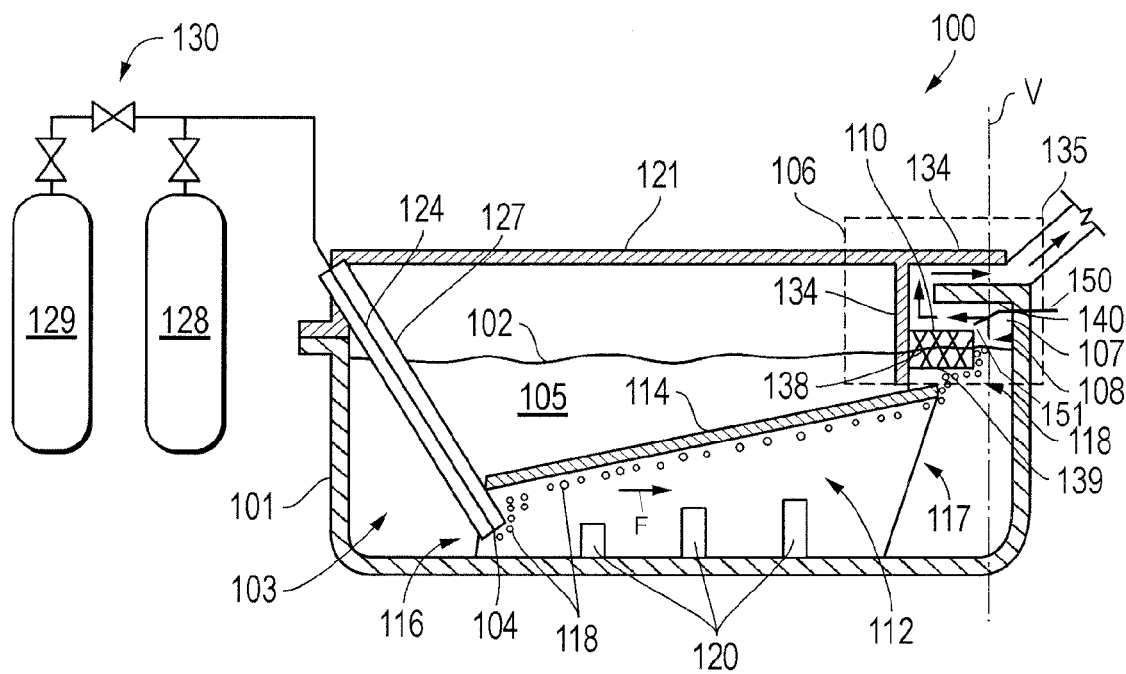
FIG. 1 is a diagrammatic representation of an apparatus embodying the principles of the invention.

Referring to the diagrammatic representation of FIG. 1, an apparatus 100 for producing carbon nanostructures according to the present invention includes a reactant liquid vessel 101 for containing a reactant liquid 105 at a reactant liquid level 102. An injection arrangement shown generally at reference numeral 103 allows a stream of feed material to be injected into reactant liquid vessel 101 at an injection point 104 below reactant liquid level 102. Apparatus 100 further includes a collection arrangement shown generally in dashed box 106. The illustrated collection arrangement includes a collection chamber 107 positioned to receive effluent escaping from the reactant liquid in an effluent ejection area shown generally at reference numeral 108. The collection arrangement also includes a collection surface 110 within collection chamber 107, the collection surface residing at a position above the reactant liquid level and adjacent to effluent ejection area 108.

Figure 2:
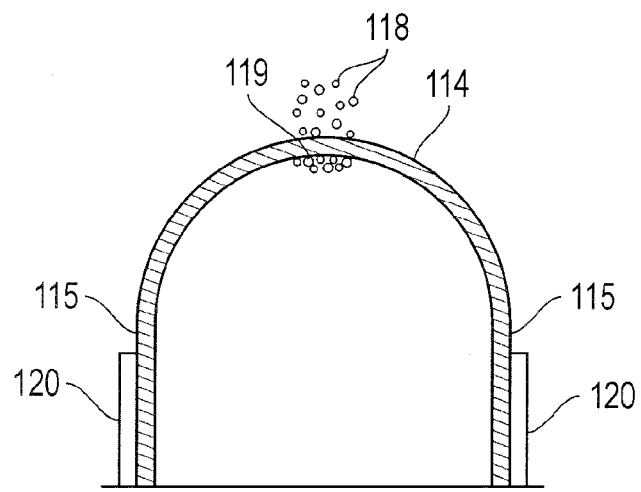
FIG. 2 is a diagrammatic end view of an outlet end of the reaction chamber shown in FIG. 1.

The apparatus shown in FIG. 1 includes a reaction chamber portion formed within vessel 101 below the reactant metal level 102. This reaction chamber is shown generally at reference numeral 112 and is defined by a tunnel structure having an upper wall 114 located below the reactant liquid level 102 in vessel 101. The tunnel structure is best shown in the end view of FIG. 2 and includes side walls 115 in addition to the upper wall 114. Referring again to FIG. 1, the tunnel structure produces an elongated tunnel below the reactant liquid level 102 in vessel 101. Feed material is injected at a feed end 116 of the tunnel structure and reaction products from the reaction of the feed material in the reactant liquid exits the tunnel structure at an outlet end 117. The figures show these reaction products in the reactant metal as bubbles 118. Preferred forms of the tunnel structure include one or more flow channels or lips 119 at the outlet end 117 that each defines a location in which the relatively light reaction products collected at the top of the tunnel structure exit the tunnel. The importance of directing the reaction products to particular locations will be described further below in connection with the collection chamber 107.

The function of the tunnel structure defined by side walls 115 and upper wall 114 is to help ensure good contact between the reactant liquid and the feed material and between the reactant liquid and any intermediate reaction products that form from initial reactions of feed material, and to ensure sufficient residence time for the feed material and reaction products in the reactant liquid. This contact and residence time helps ensure the isolation of substantially all carbon from the carbon-bearing feed material and elevation of the resulting carbon anions to the desired conditioned carbon anions. The placement of the tunnel below the reactant liquid level 102 also ensures that a pressure is maintained on the feed material and intermediate reaction products. This pressure results from the column of reactant liquid above the feed material and intermediate reaction products. The tunnel structure shown in the present drawings includes one or more vents or passages 120 along the length of the tunnel structure to allow fresh reactant liquid to continually flow into the tunnel structure along its length and to help accommodate the expansion of gasses in the tunnel.

The form of the invention shown in FIG. 1 includes an enclosure 121 over reactant liquid vessel 101. It will be appreciated that apparatus 100 will also commonly require an arrangement for heating the reactant liquid to maintain it in a desired temperature range, and an arrangement for circulating the reactant liquid in vessel 101 and especially through the reaction chamber 112 defined by the tunnel structure walls 114 and 115 in the direction shown by arrow F in FIG. 1. Heating the reactant liquid may be accomplished by burning suitable hydrocarbon fuels, by electrical induction, or by any other suitable process. Further details on the tunnel structure and the structure of vessel 101 and arrangements for heating and circulating reactant liquid, particularly a liquid reactant metal such as aluminum alone or together with other metals, may be found in U.S. Pat. No. 6,227,126, which is incorporated herein by this reference. However, since these details are not necessary for an understanding of the present invention, such details are omitted here.

Feed material injection arrangement 103 includes an injection conduit 124 having an outlet end that extends to injection point 104 below the reactant liquid level 102. The injection point 104 is located so that the feed material exiting the conduit is captured within the tunnel structure under upper wall 114, and thus is forced to flow along the upper wall and along the entire length of the tunnel structure before it can exit the reactant liquid in effluent ejection area 108. This flow along the lower surface of upper tunnel wall 114 helps ensure complete destruction of the feed material and any intermediate reaction products that may form as the feed material is destroyed by reaction with or in the reactant liquid, and results in the formation of the desired isolated carbon anions in the reactant liquid. Injection point 104 is also preferably at a depth below the reactant liquid level 102 to produce a desired reaction pressure due to the column of reactant liquid above the injection point. For a predominantly aluminum reactant liquid, this pressure is approximately 2.4 pounds per square inch above atmospheric pressure. Due to the relatively high temperature that may be present in the reactant liquid, conduit 124 is preferably enclosed in a suitable thermal insulating sheath 127 which may comprise one or more layers of insulating material or a jacket through which a cooling fluid may be circulated. The upper end of conduit 124 is connected to a line which ultimately extends to a feed material supply 128 and preferably a purge gas supply 129 through a suitable arrangement of control valves 130.

Collection chamber 107 is located with respect to the outlet end 117 of the tunnel structure so that reaction products 118 are ultimately captured in the collection chamber. That is, the reaction products 118 flow up from flow channels 119 and traverse the surface of the reactant liquid in effluent ejection area 108 into the area defined as collection chamber 107. This area is defined by chamber walls 134. An outlet conduit 135 receives material that is not collected within chamber 107, and removes that material from the system. This material removed through conduit 135 may include gasses such as hydrogen and nitrogen, carbon, and particulates that escape the reactant liquid bath. Although it is not shown in FIG. 1, it will be appreciated that suitable equipment may be connected to outlet conduit 135 to remove recoverable material from the effluent that reaches the outlet conduit.

In the form of the invention shown in FIG. 1, collection surface 110 comprises an upper surface of a collection structure 138 that either floats or is fixed so that a lower surface 139 of the structure resides below reactant liquid level 102 while the collection surface 110 resides above the reactant liquid level in collection chamber 107. A deflection surface 140 may also be included in collection chamber 107 positioned to deflect effluent traversing the surface of the reactant liquid in effluent ejection area 108 so that the effluent, including the conditioned carbon atoms, flow over collection surface 110. It will be noted that in the embodiment shown in FIG. 1, both collection surface 110 and deflection surface 140 extend in a respective plane transverse to a device vertical axis V. Also, in the embodiment shown in FIG. 1, lower surface 139 of collection structure 138 forms a blocking structure positioned above the respective flow channel 119 and below the reactant liquid level 102 in reactant liquid vessel 101. The effluent from the feed material/reactant liquid reaction must flow around this blocking structure in order to reach effluent ejection area 108 and exit the reactant liquid.

Collection surface 110 may be located from just above reactant liquid level 102 (an inch or less) to as much as three feet above the reactant liquid. One or more seed objects may be included on collection surface 110. Seed objects may be any type of objects that encourage or facilitate the assembly of carbon nanostructures from the conditioned carbon atoms exiting the reactant liquid bath. Seed objects may include pure catalyst metals such as titanium and platinum, for example, or metal oxides such as manganese oxide, magnesium oxide, copper oxide, chromium oxide, and titanium oxide, for example. The catalyst may or may not be sacrificial. Seed objects may also include graphite surfaces, carbon surfaces, and seed carbon nanostructures. The seed objects may be spaced apart across collection surface 111 or may make up the entire collection surface. For example, the entire collection structure 138 may be formed from graphite or carbon or some other material that serves as a seed material. In another example, seed objects comprising atoms of catalyst metals may be liberated from reactant liquid 105 and deposited across collection surface 110 as described in related U.S. patent application Ser. No. 11/025,717.

Figure 3:
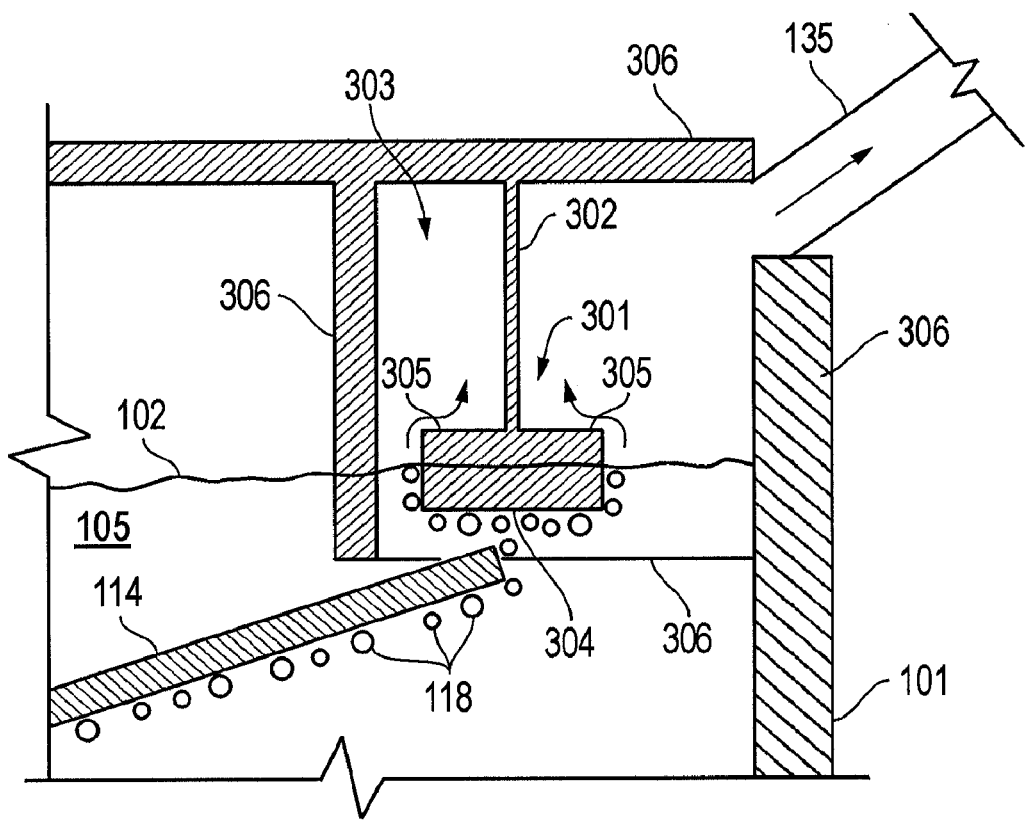
FIG. 3 is a diagrammatic representation of an alternate collection chamber according to the present invention.

Referring to FIG. 3, an alternate collection surface arrangement includes a collection structure 301 mounted on a rod 302 or other suitable support in collection chamber 303 defined by chamber walls 306. Lower surface 304 of structure 301 provides a blocking surface similar to surface 139 shown in FIG. 1, while surface 305 provides the collection surface in the embodiment shown in FIG. 3. This alternate embodiment is advantageous because the entire collection structure 301 may be readily withdrawn from collection chamber 303 through a suitable access opening (not shown) in the chamber in order to gain access to the collection surface 305 and remove carbon nanostructures that have collected on the collection surface. It is noted that the vessel 101, outlet conduit 135, tunnel upper wall 114, reactant liquid 105 and reactant liquid level 102 are identical to those shown in FIG. 1.

Figure 4:
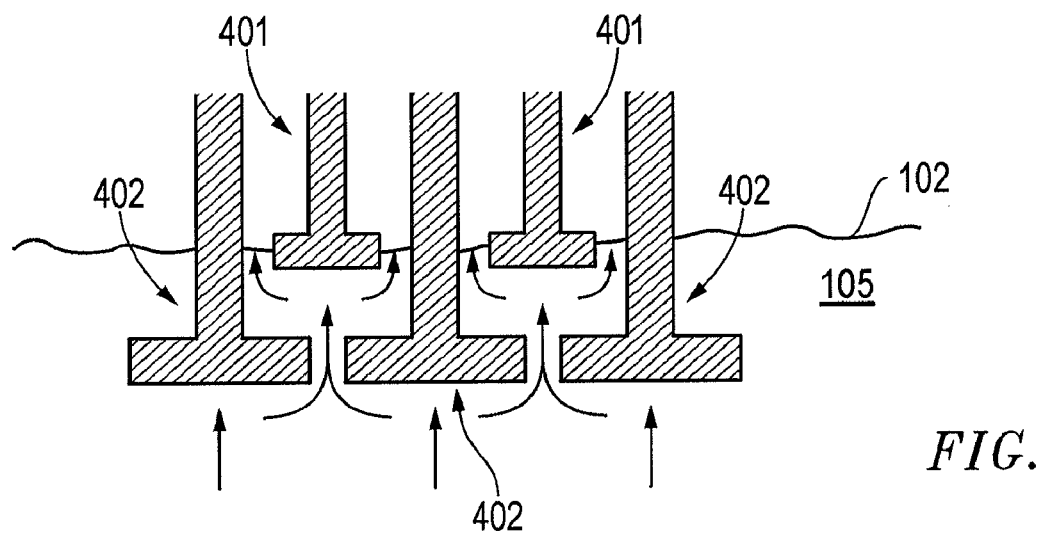
FIG. 4 is a diagrammatic representation of another alternate collection surface arrangement within the scope of the present invention.

The alternative embodiment shown in FIG. 4, includes collection structures 401 similar to structure 301 shown in FIG. 3. However, the embodiment shown in FIG. 4 also includes additional blocking structures 402 supported below the reactant liquid level 102. These blocking structures 402 direct reaction products in the reactant liquid 105 toward a central portion of each collection structure 401 so that the reaction products must flow around the collection structures to exit the reactant liquid. It will be noted that the view in FIG. 4 is at about 90 degrees to the view in FIGS. 1 and 3. It will be further noted that multiple spaced apart flow channels at the outlet end 117 of a tunnel structure such as that shown in FIG. 1 would be required to allow the reaction products to flow up properly beneath each of the blocking structures 402 shown in FIG. 4.

Figure 5:
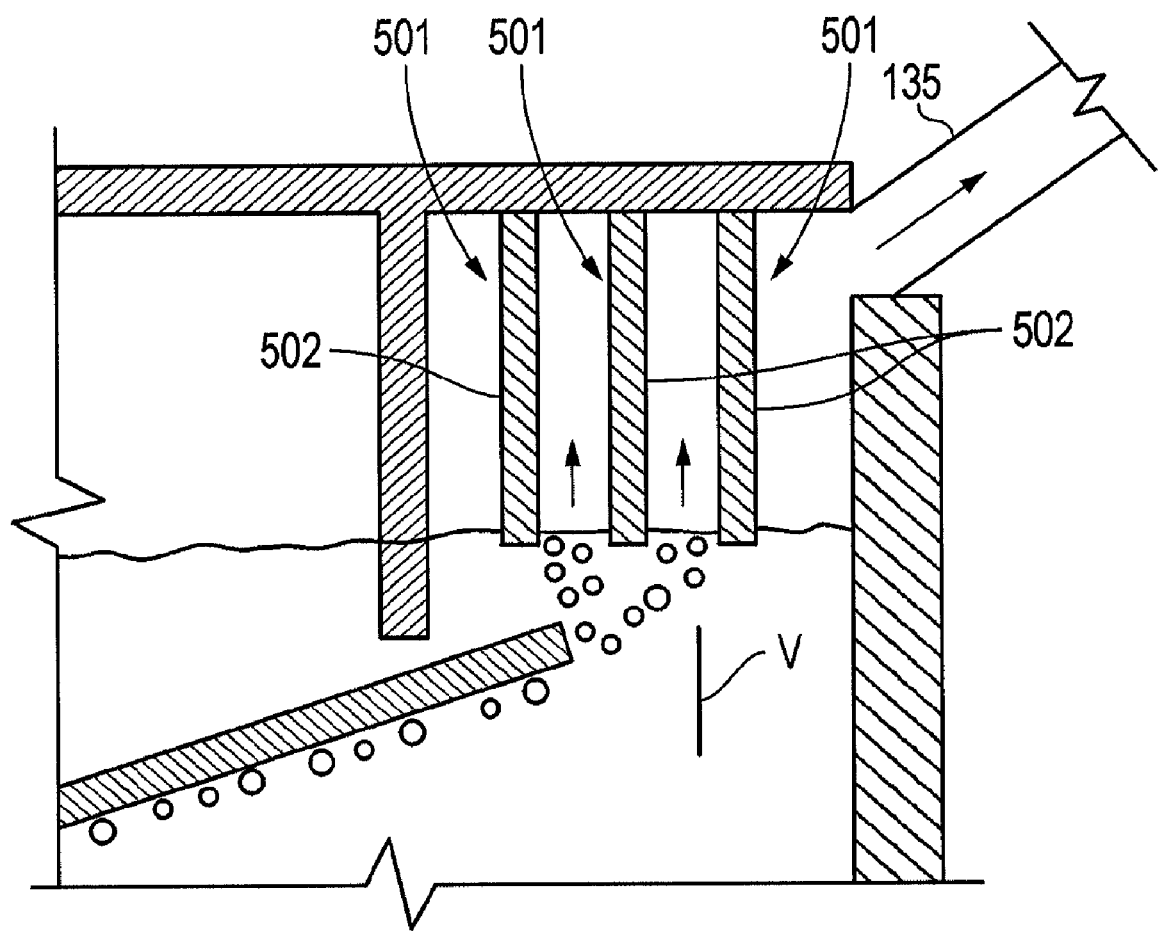
FIG. 5 is a diagrammatic representation of another alternate collection chamber according to the present invention.

The alternate collection arrangement shown in FIG. 5 includes a series of collection members 501 having vertically extending collection surfaces 502. The vertical orientation of surfaces 502 is in contrast to the collection surface 110 shown in FIG. 1, which extends transverse to the device vertical axis V. That is, the collection surfaces 502 extend parallel to device vertical axis V rather than transverse. Collection members 501 may comprise cylinders or plates that are spaced apart sufficiently to allow effluent other than the materials to be incorporated in nanostructures to reach outlet conduit 135.

A method according to the present invention may now be described with reference particularly to the embodiment shown in FIG. 1. Such a method includes isolating carbon atoms from hydrocarbon molecules by reaction within or with a reactant liquid and maintaining the isolated carbon atoms in the reactant liquid for a sufficient period of time to place the carbon atoms in the desired excited form as conditioned carbon anions. This step is performed in apparatus 100 in FIG. 1 by contacting a carbon-bearing feed material from supply 128 with the reactant liquid in vessel 101. Sufficient contact time to produce the conditioned carbon anions is achieved in apparatus 100 by ensuring that the feed material and any intermediate reaction products must flow the entire length of the tunnel structure defined by upper tunnel wall 114 and side walls 115. Also, the reactant liquid is maintained at a suitable reaction temperature to effect the desired liberation of carbon atoms. For example, where the reactant liquid is made up predominantly of aluminum the liquid is maintained between approximately 650 degrees Celsius and approximately 950 degrees Celsius, and more preferably at approximately 900 degrees Celsius. Injection point 104 and upper tunnel wall 114 are located deep enough in the reactant liquid to produce a desired reaction pressure, preferably at least 2.4 psig at least at some point in the apparatus where the reactant liquid comprises predominantly aluminum. These preferred temperatures and pressure conditions together with the nature of the reactant liquid ensure the production of the desired conditioned carbon anions.

The time and energy required to liberate carbon atoms from the carbon-bearing feed material will depend upon the nature of the feed material. For example, assuming a feed material of $CH_3$, approximately 1735.5 Btu of kinetic energy per mole of feed material will be required to liberate the carbon atoms from the $CH_3$ molecules. The energy required for this carbon liberation step may also be calculated for other carbon-bearing feed materials based on the bond energy required to break the chemical bonds to or between the carbon atoms in the respective feed material. Additional energy is then required to produce the desired conditioned carbon anions, that is, carbon anions at least at the SP3 hybrid energy state. Specifically, about 11 eV of kinetic energy is required to energize the carbon from the ground state to the first activation energy level, and about another 1.88 eV of energy is required to move the carbon (that is, the electrons associated with the carbon atom) from the first activation energy to the second activation energy level, which may be referred to as the 3PS2P2 energy state. From this point, additional energy in the amount of approximately 8 eV is required to move the electrons associated with the carbon atom from the second activation energy level to the 5S atomic structure of the SP3 hybrid energy state. Thus, once the chemical bonds of the feed stock are broken to isolate a carbon atom into the reactant liquid, the carbon then requires about $3.1703 \times 10^{-21}$ Btus of energy per carbon atom, that is, about 25 electron volts of kinetic energy per atom, to be converted to the desired conditioned carbon anions. It will be noted that these conditioned carbon anions remain highly energetic while in the high energy conditions of the liquid reactant, and remain highly energetic and unstable at the time they escape from the high energy conditions of the liquid reactant material, such as by eluding into the collection chamber 107 shown in FIG. 1.

To produce carbon nanostructure from the conditioned carbon anions generated in the reactant liquid, the conditioned carbon anions are allowed to traverse the surface of the reactant liquid in effluent ejection area 108, and are directed across collection surface 110 which may include one or more seed materials or objects. Collection conditions are maintained in chamber 107 and at collection surface 110 at which the conditioned carbon anions phase change to a ground state by carbon nanostructure self-assembly.

Maintaining collection conditions in chamber 107 and at surface 110 may include controlling the temperature and effluent flow conditions as well as the appropriate atmosphere in chamber 107. In particular, an appropriate collection atmosphere comprises an atmosphere that does not chemically or physically interfere with the desired carbon nanostructure formation. Purging collection chamber 107 of materials that could chemically react with the conditioned carbon anions before they can form the desired nanocarbon structures may be particularly important in creating and maintaining the desired collection atmosphere. Thus, a preferred process includes first purging the chamber 107 by directing a suitable purge gas such as argon or some other noble gas or an inert gas from purge supply 129 to chamber 107. A separate purge arrangement may alternatively or additionally be included in the system with a purge inlet directly in chamber 107 to prevent having to run the purge gas through the reactant liquid.

The flow regime of effluent exiting the reactant liquid and flowing through collection chamber 107 may be important for allowing the conditioned carbon anions to bond together to produce the desired carbon nanostructures without extraneous atoms becoming incorporated in the structures. It is believed that a low velocity turbulent flow regime over collection surface 110 110 (that is, a flow producing eddy currents over the collection surface) best facilitates the production of carbon nanostructures without incorporating heavier atoms (such as metals) that may escape from the reactant liquid bath. It may also be possible to adjust the flow rate and composition of effluent flowing over collection surface in order to encourage the incorporation of various atoms other than carbon in the carbon nanostructures produced at the collection surface. The invention encompasses numerous techniques for controlling the composition and flow rate of effluent through collection chamber 107 and over collection surface 110. The relative amount of carbon-bearing feed material in the material injected at point 104 and the type or types of hydrocarbon materials injected may influence both flow rate and content of flow. An inert or noble gas may be injected together with the feed material from purge gas supply 129 or from some other supply to affect the flow rate of effluent through chamber 107 and the content of the effluent.

Some forms of the invention may purposely inject one or more materials into the collection chamber 107 through a separate collection chamber input, that is, separate from effluent ejection area 108, in order to affect the flow characteristics in the flow chamber and in order to provide desired materials to be incorporated in the carbon nanostructures. Such a separate collection chamber input may include a suitable tube such as the example tube 150 shown in FIG. 1 which traverses a collection chamber wall and which includes an injection end 151 at a point to direct injected materials against collection surface 110 as effluent flows up from the reactant liquid 105 and passes over the collection surface. Particles of seed material may also be injected into collection chamber 107 with such an injection conduit. These particles of seed material may be injected prior to enabling the conditioned carbon anions to flow across collection surface 110 or while conditioned carbon anions are flowing across the collection surface.

Numerous other variations may be employed to produce the desired flow regime and flow characteristics through collection chamber 107. Two methods are employed in apparatus 100 shown in FIG. 1. One method employs deflection surface 140 to deflect effluent escaping from the reactant liquid at effluent ejection area 108. This deflection is preferably produced anywhere from just above the surface of the reactant liquid to approximately three feet above the surface of the reactant liquid. Other types of deflection surfaces or features may also be employed according to the present invention. The other flow regime and characteristic affecting technique used the apparatus shown in FIG. 1 comprises providing collection surface 110 in a transverse plane with respect to device vertical axis V along which the effluent initially flows as it escapes the reactant liquid. Providing this transverse collection surface 110 produces a low pressure area on the collection surface in an area near the rightmost edge in FIG. 1. The low pressure area created as effluent flows over the rightmost upper edge of collection structure 138 in FIG. 1 is believed to encourage the collection of conditioned carbon anions at that location of collection surface 110 and the production of carbon nanostructures at that location. It will be appreciated that numerous different collection surface profiles or contours may be employed to encourage the desired collection of conditioned carbon anions and self-assembly of nanostructures. For example, collection surface 110 may include one or more projections and/or indentations to produce the desired flow characteristics across the collection surface.

Any number of reactant liquids may be used to react the feed materials or feed material constituents according to the present invention. A preferred reactant liquid comprises liquid aluminum either alone or with other metals as disclosed in U.S. Pat. No. 5,000,101, which is also incorporated herein in its entirety. Temperatures may preferably range from approximately 650 degrees Celsius to approximately 950 degrees Celsius for reactant metals incorporating a substantial fraction of aluminum. Other reactant liquids may be used within different temperature ranges sufficient to liberate carbon atoms and place them in the desired chemically excited state as conditioned carbon anions for assembly into nanostructures at collection surface 110. The invention encompasses any liquid that either reacts with the feed material or otherwise causes carbon atoms to be liberated from the feed material and excited to conditioned carbon anions. The carbon atoms may be liberated by chemical reduction (as in the case of a reactant liquid made up predominantly of aluminum), by chemical oxidation, by providing chemically neutral electron reduction potentials, or by applying sufficient kinetic energy (through heat) to break the carbon bonds to other atoms in the feed molecules, or by any of these mechanisms. Liberated carbon atoms may then be converted to the desired conditioned carbon anions by any suitable process, preferably by heat applied through the reactant liquid. The reactant liquid may be a metal, acid, base, salt, or any combination of these. The temperature of the particular liquid will depend upon the particular reaction required to liberate carbon atoms from the feed material and the nature of the reactant liquid itself. For example, chemically neutral liquids that liberate carbon atoms by heat alone may be held at very high temperatures to produce the desired carbon liberation, and excitation to conditioned carbon anions. Temperatures on the order of approximately 1500 degrees Celsius or more may be required for carbon liberation and excitation by heat alone.

Collection surface 110 is also preferably maintained in a similar temperature range as the reactant liquid, and most preferably at a temperature just below the reactant liquid temperature, for example, approximately fifty (50) degrees Celsius or less below the liquid reactant temperature. Thus, the collection surface 110 and collection chamber 107 in areas near the collection surface will be isothermic or nearly isothermic with respect to the reactant liquid. It is believed that these reactant liquids, and temperatures, together with the reaction pressure and contact time with the reactant liquid not only liberate the carbon atoms from the hydrocarbon feed material but also places the liberated carbon in the excited state as conditioned carbon anions. The reactant liquid is also believed to surround the liberated carbon atoms while they are still in the reactant liquid to maintain the carbon atoms in the chemically excited state as conditioned carbon anions and prevent them from phase changing to a ground state before they have a chance to self-assemble into the desired nanostructures at the collection surface 110. The conditions are maintained at the collection surface according to the present invention so that these conditioned carbon anions phase change to a ground state as they bond covalently with other carbon atoms at the collection surface to form the desired carbon nanostructures.

It will be appreciated that some carbon that escapes the reactant liquid may also be diatomic carbon and double or triple bonded carbon. As used in this disclosure and the accompanying claims, "liberated carbon atoms" includes single atom carbon, diatomic carbon, and other two-carbon combinations such as two-carbon double bonded structures and two-carbon triple bonded structures. All of the liberated carbon atoms as well as all surviving carbon molecules escaping the reactant liquid will also be chemically excited, that is, will have active electrons. Some of the two-carbon combinations and/or other surviving carbon molecules that may escape the reactant liquid may be incorporated, together with single, chemically excited carbon atoms, into molecularly combined carbon nanostructures within the scope of the present invention.

The present invention may use any number of carbon-bearing compounds as the feed material or as part of the feed material. Preferred forms of the invention utilize hydrocarbon compounds including single-bonded carbon either predominantly or exclusively. However, compounds including double and triple bonded carbon may be used according to the invention provided sufficient contact time with the reactant liquid to liberate carbon atoms and energize them to conditioned carbon anions for assembly into carbon nanostructures, or to produce chemically excited carbon molecules for assembly into carbon nanostructures. Some forms of the invention may adjust the content of the various carbon-bearing materials in a feed material mixture to provide a desired concentration of liberated single carbon atoms and liberated carbon molecules for incorporation into the desired carbon nanostructures. For example, the feed materials may be manipulated so that the effluent escaping the reactant liquid includes carbon in desired relative concentrations of single carbon atoms and double bonded carbon molecules.

It is also noted that some reactant liquids are capable of liberating carbon atoms from highly stable forms of carbon. For example, the preferred reactant liquid made up of aluminum or alloys of aluminum has the capability of liberating carbon atoms from even highly stable forms of carbon such as graphite and carbon nanostructures given sufficient contact time. Thus, some types of reactant liquids, whether they operate by chemical reduction, chemical oxidation, pyrolysis, or by reactions from acids, bases, or salts, may be used to destroy carbon nanostructures and recycle the carbon atoms from these materials in different types of carbon materials. In one aspect of the present invention, carbon nanostructure materials may be introduced into a reactant liquid such as liquid aluminum or liquid aluminum alloy at 650 to 950 degrees Celsius to isolate conditioned carbon anions from the carbon nanostructure material. The conditioned carbon anions may then be directed to a recovery area where the liberated carbon may be recovered. The recovery area may comprise a collection chamber such as chamber 107 in FIG. 1 where the carbon anions may self-assemble into new carbon nanostructures. Alternatively, the recovery area may comprise a collection surface free area in which the carbon anions are encouraged to phase change to a ground state without self-assembly into carbon nanostructures.

Figure 6:
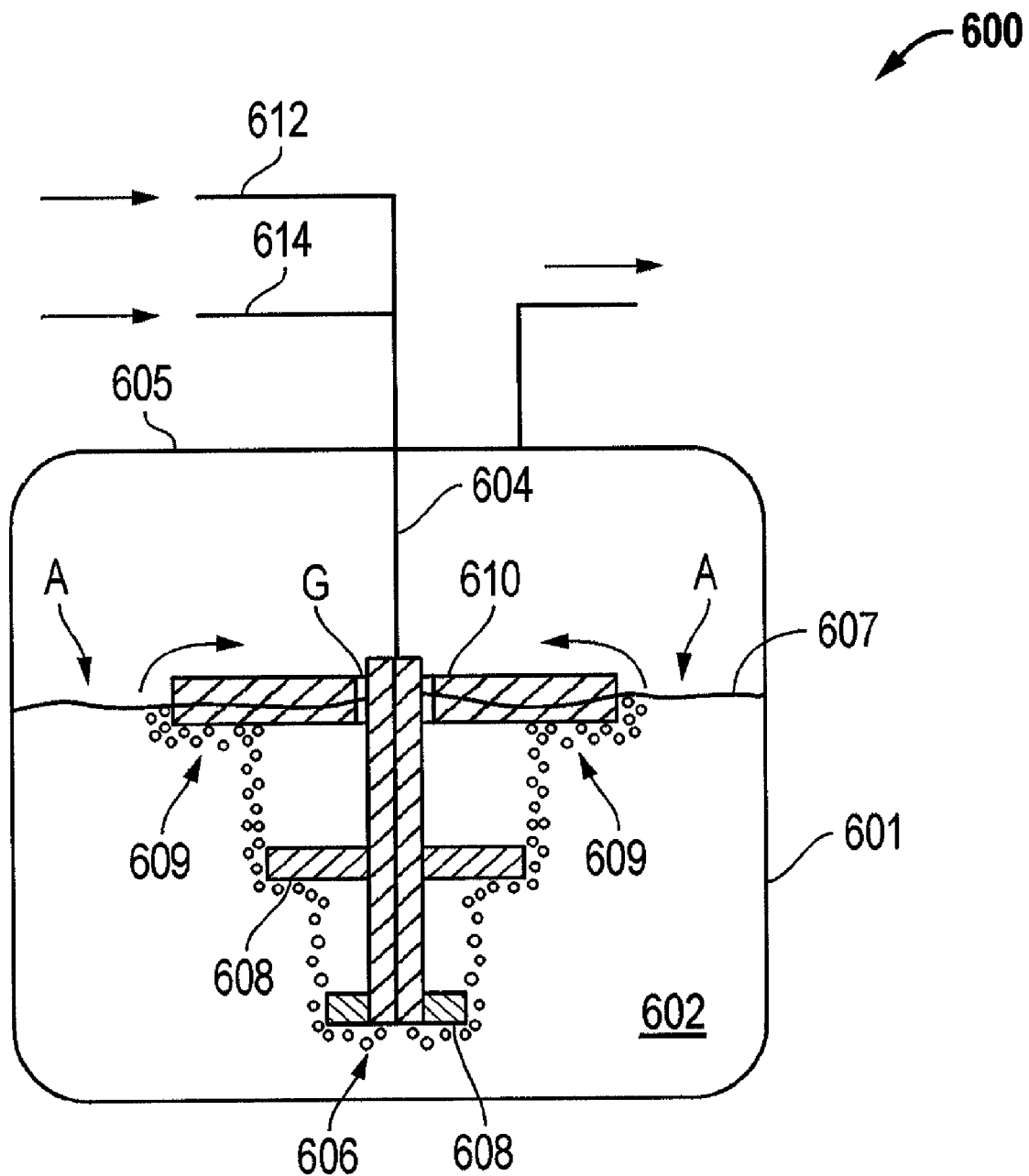
FIG. 6 is a diagrammatic representation of a test apparatus that has been used to produce carbon nanostructures according to the present invention.

Tests which were conducted according to the present invention may be described with reference to the test apparatus 600 shown diagrammatically in FIG. 6. This test apparatus 600 included a vessel 601 containing liquid reactant metal 602 made up of predominantly aluminum together with a number of other metals at about 930 degrees Celsius. The liquid reactant metal 602 was continuously circulated to and from a heating chamber not shown in FIG. 6 with a stirring device also not shown in the figure. An injection/collection structure included in test apparatus 600 was made up of an injection conduit 604 that extended down from a top wall 605 to an injection point 606 below the level 607 of reactant metal 602. Subsurface deflecting elements 608 helped prevent reaction products 609 from escaping the bath too quickly. A collection structure 610 included a rectangular plate generally centered in vessel 601. Effluent escaping from the reactant metal 602 traversed the surface of the metal at level 607 in areas A and in small gaps G between injection conduit 604 and collection structure/plate 610. During the collection part of the test, plate 610 was mostly submerged in liquid metal 602 leaving at most about one-half inch of the plate thickness above level 607.

In the tests, once the injection conduit/collection structure was in place in vessel 601, argon gas was injected through input line 612 and ultimately through conduit 604 and the reactant metal to displace air and any other gasses trapped in the area between level 607 and top 605 which formed the collection area of the apparatus. Once the collection area was purged with argon gas, methane was injected through input 614 at a rate of approximately four liters per minute for between thirty and forty-eight hours. Thereafter, acetylene gas and motor oil were also pumped through conduit 604. The injection conduit/collection structure was then removed from vessel 601 and allowed to cool in open air. Black soot-like material was observed over substantially the entire upper surface of collection plate 610. This material was scraped off plate 610 in several areas and observed through a scanning electron microscope down to a resolution of approximately one micron and a transmission electron microscope at up to 200,000 times magnification. These observations showed single-walled carbon nanotubes, double-walled carbon nanotubes, nanofibers, and carbon nanoropes in the sample material.

Figure 7:
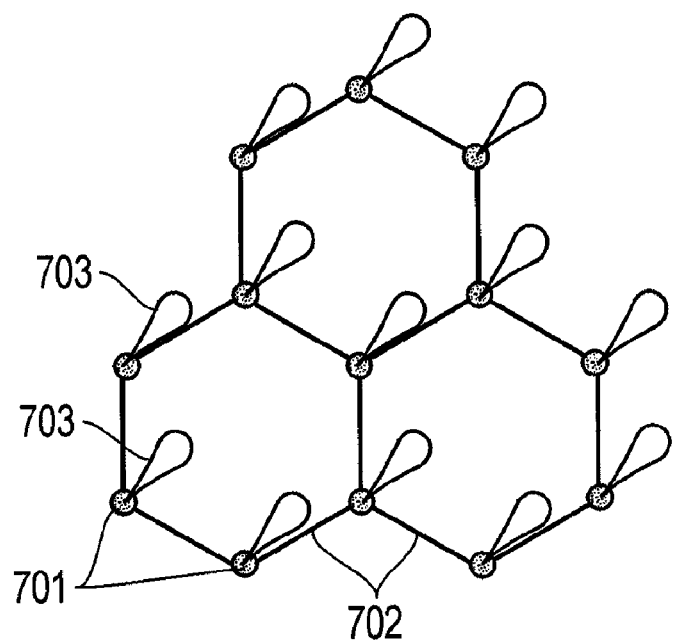
FIG. 7 is a diagrammatic isometric representation of a single-walled carbon nanostructure according to the present invention.
Figure 8:
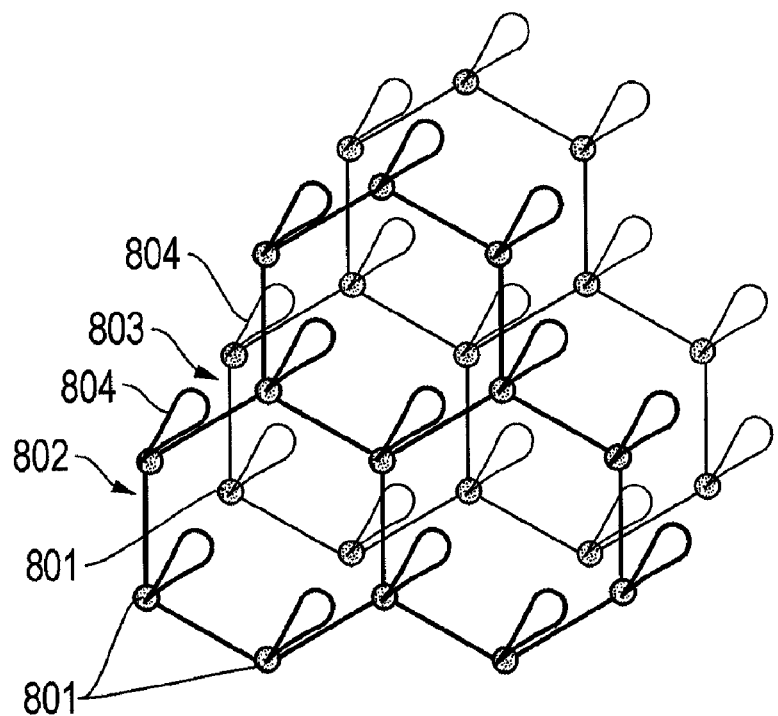
FIG. 8 is a diagrammatic isometric representation of a double-walled carbon nanostructure according to the present invention.

FIGS. 7 and 8 may be used to describe carbon nanostructures that may be produced from the conditioned carbon anions generated beneath a surface of a reactant liquid according to the present invention. A novel quality of carbon nanostructures produced from reactant liquid-generated conditioned carbon anions is that substantially all other materials, including even hydrogen may be excluded from the resulting carbon nanostructures. The resulting carbon nanostructures are made up purely of hexagonally arranged carbon atoms with each carbon atom having three covalent bonds to adjoining carbon atoms and one unbound pi electron. FIG. 7 shows a small portion carbon nanostructure made up of a single layer of hexagonally arranged carbon atoms 701. This structure may be planar or may be a portion of a nanotube wall. Each carbon atom 701 includes three covalent bonds 702 to adjoining carbon atoms 701. Each carbon atom 701 also includes one unbound pi electron 703 having an orbital extending generally at a right angle to the plane of the adjacent hexagonal arrangement. The unbound pi electrons 703 are shown in the view of FIG. 7 as extending uniformly on one side of the hexagonal rings. However, it will be appreciated that carbon nanostructures according to the invention may be formed with unbound pi electrons arranged on each side of the hexagonal rings. That is, some unbound pi electrons may extend in the direction shown in FIG. 7, while others may extend in the opposite direction.

FIG. 8 shows a small portion of another carbon nanostructure made up of hexagonal rings of carbon atoms 801. This structure, however, is made up of two distinct layers of hexagonally arranged carbon atoms, layer 802 and layer 803. Each layer 802 and 803 may be planar or each may form part of a tubular structure, a double-walled nanotube. As in the structure of FIG. 7, each carbon atom 801 is covalently bonded to three adjoining carbon atoms and includes an unbound pi electron 804 having an orbital extending generally perpendicular to the plane of the hexagonal structure. Again, the unbound pi electrons need not all extend on one side of the hexagonal structures, but may be interleaved or otherwise extend on opposite sides of the hexagonal structures.

It is believed that the hydrogen-free and impurity-free carbon nanostructures illustrated in FIGS. 7 and 8 are produced by two cooperating factors according to the present invention. First, the conditioned carbon anions and other materials, such as hydrogen, released from a carbon-bearing feed material are maintained in an isolated state beneath the surface of the reactant liquid, each completely surrounded by atoms of the reactant liquid, as individual separate "islands" in the reactant liquid. Thus, there is no possibility of contaminant incorporation with the carbon in the reactant liquid itself. Second, once the conditioned carbon anions and any energized carbon molecules escape from the bath to the isothermic or nearly isothermic nanostructure collection surface (110 in FIG. 1), the energy states of all the non-carbon atoms remains such that the non-carbon atoms form antibonding molecular orbitals with respect to carbon. This formation of molecular orbitals in the non-carbon atoms prohibits the non-carbon atoms, including hydrogen and any other atomic contaminants, from bonding with the eluding carbon anions and molecules. Rather, the eluding conditioned carbon anions rapidly phase change into carbon nanostructures while hydrogen atoms and other non-carbon atoms eluding from the reactant liquid are carried on as effluent that eventually exits the system through outlet conduit 135 in the embodiment of FIG. 1.

As used herein, whether in the above description or the following claims, the terms "comprising," "including," "carrying," "having," "containing," "involving," and the like are to be understood to be open-ended, that is, to mean including but not limited to. Only the transitional phrases "consisting of" and "consisting essentially of," respectively, shall be considered exclusionary transitional phrases, as set forth, with respect to claims, in the United States Patent Office Manual of Patent Examining Procedures (Eighth Edition, August 2001 as revised September 2007), Section 2111.03.

Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method including:
   (a) introducing a carbon-bearing material into a reactant liquid;
   (b) isolating carbon atoms from the carbon-bearing material as conditioned carbide anions located within the reactant liquid;
   (c) providing a collection area which contains at least one collection surface;
   (d) enabling the conditioned carbide anions to traverse a surface of the reactant liquid and travel into the collection area over the at least one collection surface contained in the collection area;
   (e) introducing a material into the collection chamber through a separate collection chamber input as the conditioned carbon anions travel over the collection surface, the separate collection chamber input having an injection end positioned within the collection chamber so that the material introduced into the collection chamber through the separate collection chamber input is directed against the collection surface as the conditioned carbon anions travel over the collection surface; and (f) removing carbon nanostructures from the collection chamber.

2. The method of claim 1 wherein the reactant liquid is made up of one or more liquid metals.

3. The method of claim 2 wherein the reactant liquid includes predominantly aluminum.

4. The method of claim 3 wherein the reactant liquid is held at a temperature of approximately 900 degrees Celsius.

5. The method of claim 1 wherein the reactant liquid isolates carbon atoms from the carbon-bearing material by chemical reduction, chemical oxidation, or pyrolysis, or by reactions from acids, bases, or salts.

6. The method of claim 1 wherein the material injected into the collection chamber through the separate collection chamber input includes a seed material for the formation of carbon nanostructures.

7. The method of claim 1 wherein the reactant liquid comprises a liquid metal made up predominantly of aluminum and held at a temperature between approximately 650 degrees Celsius and approximately 950 degrees Celsius, and the collection surface is at a temperature no more than fifty (50) degrees Celsius below the temperature of the reactant liquid.

8. The method of claim 1 wherein the carbon-bearing material includes carbon nanostructures.

9. The method of claim 1 wherein the carbon-bearing material includes single carbon bonds exclusively.

10. A method including:
(a) introducing a carbon-bearing material into a reactant liquid;
(b) isolating carbon atoms from the carbon-bearing material as conditioned carbide anions located within the reactant liquid;
(c) enabling the conditioned carbide anions to traverse a surface of the reactant liquid and travel into a collection area adjacent to the reactant liquid;
(d) introducing a seed material into the collection chamber as the conditioned carbon anions travel into the collection chamber, the seed material comprising a material which encourages the assembly of carbon nanostructures from the conditioned carbon atoms in the collection area; and
(e) removing carbon nanostructures from the collection chamber.

11. The method of claim 10 further including providing a collection surface within the collection area.

12. The method of claim 11 wherein the seed material is introduced into the collection chamber through a separate collection chamber input as the conditioned carbon anions travel over the collection surface, the separate collection chamber input having an injection end positioned within the collection chamber so that the seed material is directed against the collection surface as the conditioned carbon anions travel over the collection surface.

13. The method of claim 12 wherein the carbon-bearing material includes single carbon bonds exclusively.

14. The method of claim 11 wherein the reactant liquid comprises a liquid metal made up predominantly of aluminum and held at a temperature between approximately 650 degrees Celsius and approximately 950 degrees Celsius, and the collection surface is at a temperature no more than fifty (50) degrees Celsius below the temperature of the reactant liquid.

15. An apparatus for producing carbon nanostructures, the apparatus including:
(a) a reactant liquid vessel for containing a reactant liquid at a reactant liquid level;
(b) a feed material injector having an outlet end positioned within the reactant liquid vessel at a point below the reactant liquid level;
(c) a collection chamber positioned to receive effluent escaping from the reactant liquid in the reactant liquid vessel;
(d) a collection structure, the collection structure including a collection surface having at least a portion which is spaced apart from side walls of the collection chamber and which resides in the collection chamber at a position above the reactant liquid level; and
(e) a separate collection chamber input having an injection end positioned in the collection chamber so as to direct a material flowing out of the injection end against the collection surface.

16. The apparatus of claim 15 further including a reaction chamber located within the reactant liquid vessel and having an upper surface below the reactant liquid level of the reactant liquid vessel.

17. The apparatus of claim 15 wherein the collection structure is suspended in the collection chamber from a support extending from a top of the collection chamber.

* * * * *